March 25, 1952  E. J. ALBRIGHT  2,590,291
CONVEYER HAVING PIVOTAL PAN
Filed Jan. 22, 1949  2 SHEETS—SHEET 1
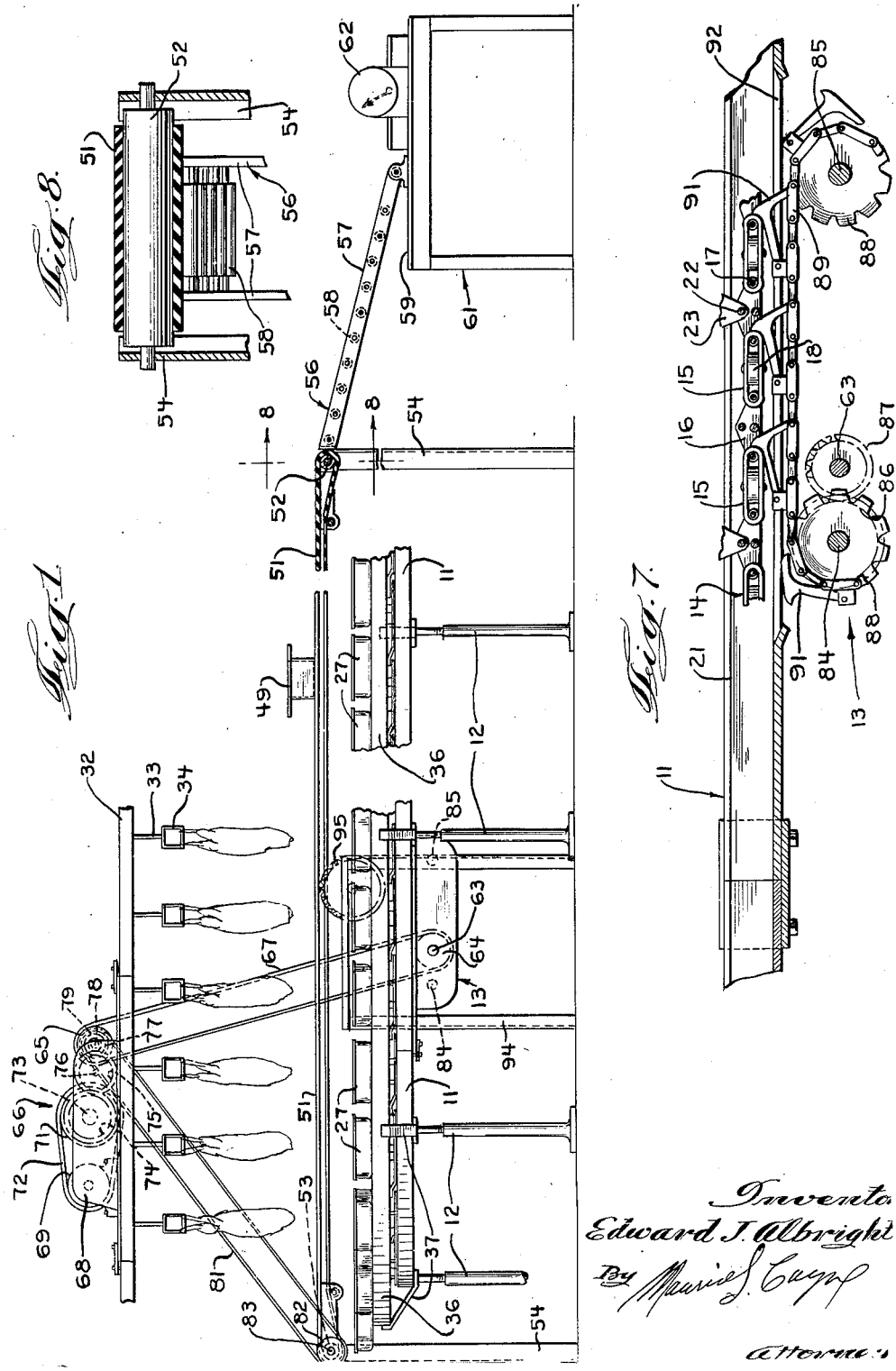
Inventor
Edward J. Albright
By
Attorneys March 25, 1952     E. J. ALBRIGHT     2,590,291
CONVEYER HAVING PIVOTAL PAN
Filed Jan. 22, 1949     2 SHEETS—SHEET 2
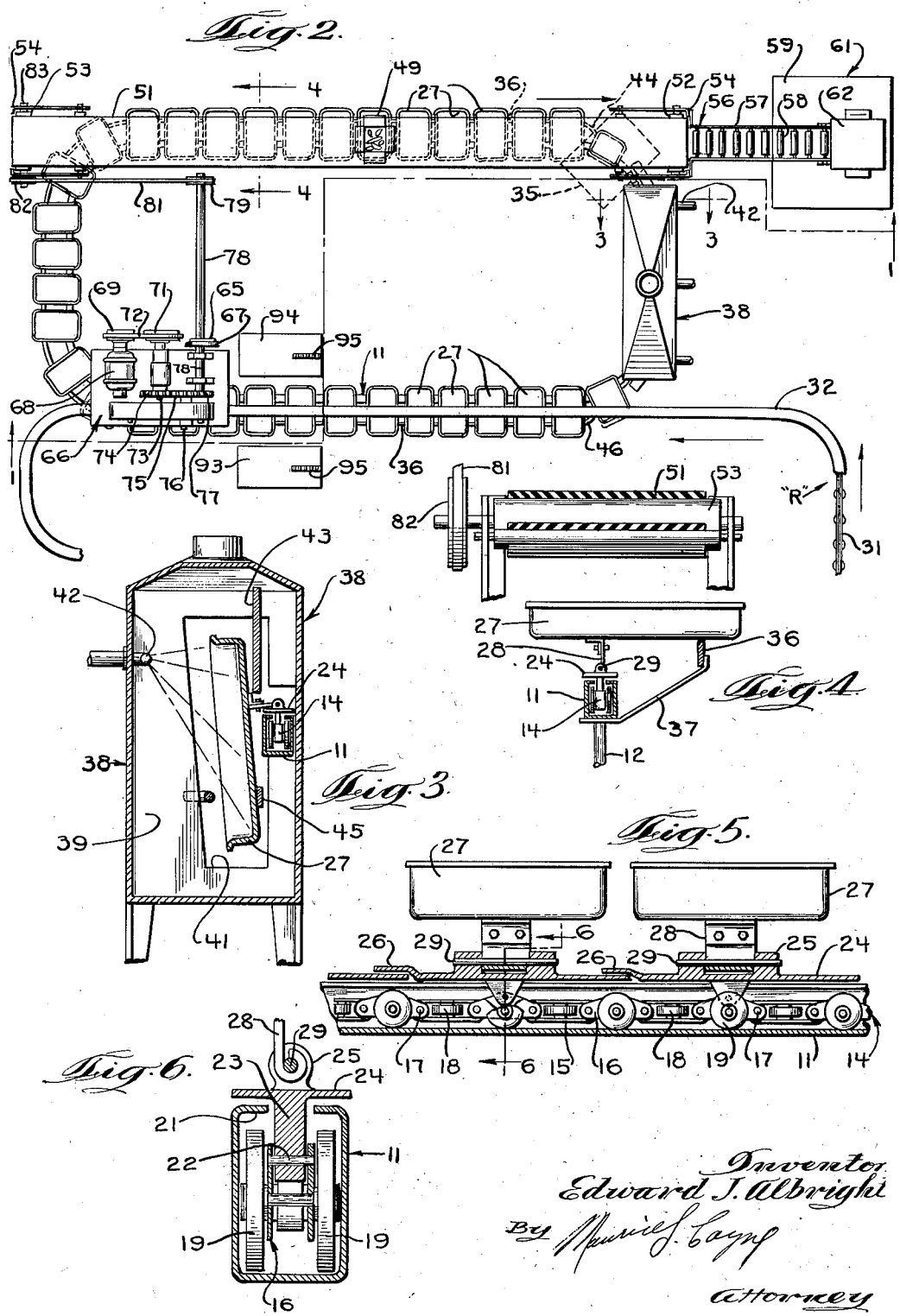

Patented Mar. 25, 1952

2,590,291

UNITED STATES PATENT OFFICE 2,590,291

CONVEYER HAVING PIVOTAL PAN

Edward J. Albright, Chicago, Ill.

Application January 22, 1949, Serial No. 72,102

7 Claims. (Cl. 198—148)

This is a continuation-in-part, of application Serial No. 577,039, filed February 9, 1945, which matured at Patent No. 2,516,499 on July 12, 1950.

The invention relates to improvements in conveyor systems and more particularly to such a system embodying novel structural features especially adapting it for use in cleaning, cutting and packaging poultry or the like.

Known types of apparatus having traversing pans or other receptacles, useful in conjunction with the evisceration of poultry, are unsatisfactory because of the difficulty occasioned in supporting the pans for use and in emptying the pans after use and positioning them properly for washing and sterilizing. It is, therefore, an object of the present invention to provide an apparatus, including an endless conveyor chain having pans hingedly mounted thereon wherein the pans are supported in a usable position over the greater part of the distance of travel of said conveyor.

Another object is to provide a conveyor chain with novel hinge elements adapted to hingedly support pans in spaced relation thereto.

Another object is to provide an apparatus of the character described, including an endless chain having a series of pans hingedly connected thereto, with novel means adapted to position and hold said pans in a substantially horizontal plane while said chain is traversing a predetermined portion of its path and to enable said pans to rest in substantially vertical position while a remaining portion of the path is traversed by said chain.

Another object is to provide an apparatus of the character described, including an endless chain having a series of pans hingedly connected thereto, with novel means adapted to position and hold said pans in a substantally horizontal plane while said chain is traversing a predetermined portion of its path and to enable said pans to rest in substantially vertical position while a remaining portion of the path is traversed by said chain.

Another object is to provide an apparatus of the character described with novel means in the form of a conveyor belt arranged in close proximity to the pans adapted to convey containers or packages into which pieces from the pans are packed, and to deliver the packed containers to a weighing table.

Another object is to provide an apparatus of the character described with novel means to facilitate packaging of pieces deposited in a pan conveyor.

Other and further objects of the present invention will be apparent from the following description and claims and are illustrated in the accompanying drawings, which by way of illustration show one embodiment and the principle thereof and which is considered to be the best mode contemplated for applying that principle. Other embodiments of the invention embodying the same principle may be used and structural changes may be made as desired by those skilled in the art without departing from the present invention and the purview of the appended claims.

In the drawings:

Fig. 1 is a side elevational view of the improved apparatus, showing portions thereof broken away.

Fig. 2 is a plan view of the apparatus.

Fig. 3 is a sectional detail view taken substantially on line 3—3 of Fig. 2.

Fig. 4 is a transverse sectional detail view taken on line 4—4 of Fig. 2.

Fig. 5 is a fragmentary longitudinal sectional view of the conveyor chain illustrating the pivotal mounting for the pans.

Fig. 6 is a transverse sectional view taken on line 6—6 of Fig. 5.

Fig. 7 is a sectional detail view similar to Fig. 5 but illustrating details of the driving mechanism for the pan conveyor chain.

Fig. 8 is a detail sectional view taken substantially on line 8—8 of Fig. 1.

Referring particularly to the installation selected for disclosure in the accompanying drawings, the apparatus includes a table-like construction consisting of an oval-shaped track 11 supported in a horizontal position elevated above the floor upon suitable legs 12. The legs 12 may be vertically adjustable so as to accommodate the apparatus to uneven supporting surfaces. The track 11 preferably is formed of sheet material substantially U-shaped in section, as best illustrated in Fig. 6, and a portion of said track is suitably cut away along one side to provide for the mounting, in close association therewith, of a driving unit generally indicated at 13. The unit 13 may be of any conventional construction and it includes suitable mechanism, to be referred to in detail presently, operative to impart positive and uniform movement in a clock-wise direction to an endless conveyor chain 14 arranged within the track 11.

As best illustrated in Figs. 5, 6 and 7, the conveyor chain 14 preferably consists of a plurality of links 15 and 16 alternately connected end to end as by pins 17. The links 15 carry rollers 18 rotatably upon a vertical axis for minimizing friction on the side walls of the track 11 when the conveyor chain is moving around a curve as at either end of the table. The alternate links 16 have a pair of rollers 19 journalled therein on a horizontally disposed axis, which rollers normally roll along the bottom wall of the track 11 and are adapted to engage the inwardly turned top margins 21 of said track when the conveyor chain moves upwardly as on an incline. Each link 16 also includes a cross-pin 22 which serves as a pivotal mounting for a lug 23 formed on the bottom face of a rectangular plate 24 carrying hinge element 25.

As best illustrated in Fig. 5, one plate 24 is mounted on every second alternate link 16 and each of said plates is suitably off-set upwardly at one end to provide a marginal lip 26 which overlies the end of the next adjacent plate. Accordingly, the plates 24 provide an unbroken covering for the open top side of the track 11 so as to effectively prevent waste or the link from entering the track and impairing the operation of the conveyor chain therein.

The spaced apart hinge elements 25 provided on the top face of each plate 24 constitute means for pivotally connecting a plurality of pans 27 to the conveyor chain for movement therewith. As shown, each pan 27 has a rigid depending complemental hinge element 28 disposed between the hinge elements 25 on a related plate 24 and pivotally retained as by a king pin 29. The depending complemental hinge element 28 on each pan is of sufficient height so that when said pans are in a substantially vertical position, as illustrated in Fig. 3, they will hang freely outwardly of one face of the track 11 and, when supported, in a manner to be described presently, in the horizontal position illustrated in Fig. 4, they are located at an elevation above said track.

The table consisting of the horizontally disposed track 11 and endless conveyor chain 14 carrying the pans 27, is used in conjunction with an overhead conveyor of any suitable type and of a kind adapted to advance poultry into positions to be worked upon by workers located at various stations around the track 11.

As best shown in Fig. 2, an overhead conveyor chain 31, which may be like chain 14, is suitably enclosed within and guided along the overhead inverted U-shaped track 32 which may be suspended from any supports (not shown) and is arranged to advance poultry from its receiving end R along a path in substantially vertical alignment with at least a portion of the track 11. In the instant arrangement, the track 32 is located above and in vertical alignment with one longitudinal side portion of the track 11 and it will be noted upon referring to Fig. 1 that the chain 31 carries a plurality of pendants 33 including shackles 34 spaced apart distances corresponding to the spacing of the pans 27 on the table conveyor chain 14. Thus it will be observed that, during the travel of the two conveyors along like paths, a fowl is held suspended above each of the related pans 27.

It is during the travel of the fowl and pans through this area that the fowl is cut up for packaging. The pieces of fowl as well as any waste material are deposited in the pans 27 and, upon the completion of the cutting operations, the pieces deposited in the pans are carried out from beneath the overhead conveyor 31 into an area of the table where packaging of the pieces is accomplished. To this end the pans 27 containing the cut pieces continue to advance around the track 11 and, at various stations preferably located along the other longitudinal side of the table, the pieces are removed from the pans by operators and packaged in a manner to be described presently.

Any unwanted materials, such as liquids and other waste, are removed from the pans and deposited in a waste receptacle 35 suitably positioned closely adjacent to and beneath one end of the table 11. Any waste remaining in the pans after they have advanced beyond the area of piece selection and packaging, are accordingly removed from the pans and said pans then are washed and sterilized before being returned to the area of the table passing beneath the fowl conveyor chain 31.

In order to accomplish the disposal of waste and the washing and sterilizing of the pans, it is desirable, in the present apparatus, to move said pans from their horizontal positions into substantially vertical positions. Such movement or repositioning of the pans during their travel along a selected portion of the track 11 is accomplished by means associated with the track 11 for supporting the pans in the selected position. The means for supporting the pans horizontal is perhaps best illustrated in Figs. 1, 2 and 4. As there shown, a rail 36 preferably is secured as by means of brackets 37 to the track 11 in such position that its upper edge is located in a plane corresponding to the plane of the bottom of the pans while the pans are horizontal. The brackets 37 extend outwardly and upwardly from the track 11 so as to locate the rail outwardly of the track 11 in the manner shown.

The rail 36 has one end terminating substantially at the juncture of the overhead conveyor 32 with the track 11 and its other end terminates substantially at the juncture where the pan conveyor leaves the area of packaging. The end portion of the track not provided with the rail 36 is fitted with means to wash and sterilize the pans after the contents thereof have been removed or dumped into the waste receptacle 35 and while the pans are in a substantially vertical position. Such washing and sterilizing means is described and claimed in my co-pending application aforesaid now Patent No. 2,516,499, granted July 12, 1950.

It is sufficient to note at this time that the washing and sterilizing means preferably consists of a sheet metal housing 38 suitably arranged to enclose the end portion of the track 11 not provided with the rail 36. Upon referring to Fig. 3, it will be noted that the pan conveyor track 11 extends through the housing 38 closely adjacent to one wall thereof. The end walls 39 of said housing are cut out as at 41 to enable free passage of the vertical pans 27 therethrough. One or more spraying elements 42 is provided in the housing 38 in such positions as to spray steam and water against the inside face of the vertically suspended pans as they advance through the housing. A baffle 43 is provided within the housing 38 rearwardly of the vertically positioned pans 27 so as to prevent spray from striking the track 11 and the conveyor chain 14 therein. In this manner the necessary lubricant for the conveyor chain 14 is prevented from being washed out of the track 11.

As has been explained hereinabove, the pans 27 are normally held substantially horizontal by the rails 36 for a predetermined portion of their circuit around the table and are permitted to drop into a vertical position to discharge their waste contents and for washing and sterilizing, whereupon they are again raised into their initial horizontal position. Accordingly, the apparatus is provided with means to cause a gradual lowering of the pans from the horizontal position into the vertical position and with means to again elevate said pans into their horizontal position. The means to gradually lower the pans preferably consists of a rail section 44, shown in Fig. 2, provided at one end of the rail 36. This rail section merges with the rail 36 and is inclined downwardly and inwardly toward the track 11 to merge with a horizontally disposed auxiliary rail 45 located below and in a plane substantially co-inclined with the outside face of the track 11. Thus it will be seen that as a pan advances off of the end of the rail 36 it swings downwardly gradually into its vertical or dumping position. The auxiliary rail 45 extends through the sterilizing and washing unit 38 and provides a backing surface against which the vertically suspended pans 27 are rested during their movement through said unit. The other end of the auxiliary rail 45, at the outlet end of the unit 38, merges with an arcuate rail portion 46 which rises gradually so as to merge with the other end of the rail 36. This arcuate rail portion 46 provides means for gradually elevating the pans 27 from their vertical position into the horizontal position required for use.

In order to facilitate efficient packing of the pieces of fowl contained in the pans 27 and carried out from beneath the overhead conveyor chain 31, means is associated with one longitudinal side of the table for successively advancing containers 49 adapted to receive the pieces. As best shown in Figs. 1 and 2, such means consists preferably of an endless conveyor belt 51 suitably trained over rollers 52 and 53 having their axles journalled in a frame 54 at a height sufficient to locate the upper reach of the belt 51 at a convenient distance above the tops of the conveyor pans 27. This belt is adapted to be driven through the common drive means, to be described in detail hereinafter, operative to drive the pan conveyor and overhead conveyor at uniform speeds.

In use, the three conveyors are operated in unison so that fowl is advanced over the pan conveyor during which time said fowl is suitably cut and the pieces are deposited in the pans. As the pans carrying such pieces continue around the circuit of the table, they are carried beneath the package conveyor 51 whereupon operators select pieces of the fowl from the pans and deposit them in selected containers 49. The containers 49, containing the desired number of pieces of the fowl, advance with the belt conveyor 51 and move off of the end thereof onto an inclined anti-friction chute 56 preferably of a type including side rails 57 and transverse connecting rollers 58. Containers moving down the chute 56 are deposited on any suitable surface such as the top 59 of a table 61 so as to be picked up by an operator and weighed upon the scale 62. It should be understood, however, that the table 61 and scale 62 need not be provided but, if desired, other means may be associated with the discharge end of the chute 56 to facilitate further processing or handling of the containers discharged therefrom.

As indicated hereinbefore, the means for driving the three conveyors is adapted to be operated in unison so that all of said conveyors advance at the same rate of speed. Accordingly, common drive means is provided for said conveyors. As best shown in Fig. 1, the pan conveyor driving unit 13 includes a shaft 63 having a pulley 64 on its extended end operatively connected with a pulley 65 on a power driven unit, generally indicated at 66 associated with the overhead conveyor chain 31, by means of a belt 67. The power driven unit 66 is substantially like the unit 13 except that it includes a motor 68 carrying a pulley 69 for imparting rotation to an idler pulley 71 through a belt 72. The idler pulley 71 is carried on the end of an idler shaft 73 having a gear 74 fixed on its other end, constituting one of a plurality of gears in a gear reduction drive best shown in Fig. 2. The gear 74 meshes with a gear 75 carried on an intermediate shaft 76 in the upper power unit 66, which moves with a pinion 77 firmly secured on a shaft 78 carrying the pulley 65. Thus it will be observed that operation of the motor 68 will impart rotation to the intermediate shaft 73 in the upper unit 66 and to the shaft 63 in the lower unit 13.

The shaft 78 in the upper power unit 66 extends rearwardly, as viewed in Fig. 2, and carries on its end a pulley 79. A belt 81 connects the pulley 79 with a pulley 82 carried on the shaft 83 of one of the package conveyor belt rollers 53. It should be apparent at this time that all three conveyor units are operated by means of a common power source.

Since the units 13 and 66 are alike in the construction of the mechanism operated by rotation of their respective shafts 63 and 78, the following description is limited to the remaining details of construction of but one of said units but is applicable to both units and like numerals are used to identify corresponding parts.

As best shown in Figs. 1 and 7, the unit 13 having the shaft 63 driven by the pulley 64 also includes parallel shafts 84 and 85. The shaft 84 is positively driven by rotation of the shaft 63, as through gears 86 and 87, and both shafts 84 and 85 carry sprockets 88 having an endless chain 89 trained thereover. The chain 89 carries a plurality of uniformly spaced apart lugs 91 which extend through a slot 92 in the bed plate of the unit 13 and are adapted to engage and disengage successively with the links 15 of the conveyor chain 14 to thereby advance said conveyor chain 14 at a uniform rate of speed during the operation of the unit 13. The like construction provided in the upper unit 66 similarly coacts with the endless conveyor 31 to advance it at the same uniform rate of speed as the conveyor chain 14. Thus it will be evident that both conveyors are advanced in unison so as to retain the poultry suspended from the overhead conveyor 31 above a related pan 27 on the table throughout their coinciding paths of travel.

In order to facilitate the cutting of the poultry suspended above the conveyor pans 27, suitable work tables 93 and 94 preferably are provided, one on each side of the pan conveyor. Each of these tables preferably is provided with a power driven circular saw 95.

Although an exemplary installation and form of construction have been disclosed in the accompanying drawings and described in detail hereinabove, it should be understood that the invention is capable of embodying a variety of modifications in detail structure and may be incorporated in apparatus having a layout differing from the specific layout illustrated without departing from the spirit of the invention or the scope of the appended claims.

I claim:

1. An apparatus of the character described comprising, in combination, an endless track substantially U-shaped in section, an endless conveyor chain in said track, said conveyor chain including substantially rectangular plates overlying said track and overlapped at their ends, a hinge element on each plate, a plurality of pans carried by said conveyor, and a complemental hinge element on each pan adjacent one end for hingedly connecting the pans one to each plate.

2. An apparatus of the character described comprising, in combination, an endless track substantially U-shaped in section, an endless conveyor chain in said track, said conveyor chain including substantially rectangular plates overlying said track and overlapped at their ends, a hinge element on each plate, a plurality of pans carried by said conveyor, and a complemental hinge element on each pan adjacent one end for hingedly connecting the pans one to each plate, and means coextensive with a substantial portion of the endless track to support the other ends of the pans while they are carried along said track portion.

3. A conveyor system comprising a track substantially U-shaped in section, a conveyor chain in said track, said chain consisting of a plurality of links joined to one another at their extremities, rollers on said links to roll in said track, a plurality of plates overlying said track and connected to selected links, and a plurality of pans, one of said pans being hingedly connected to each of said plates.

4. A conveyor system comprising a track substantially U-shaped in section, a conveyor chain in said track, said chain consisting of a plurality of links joined to one another at their extremities, alternate vertical and horizontal rollers on alternate links, said rollers being arranged to roll in said track, a plurality of plates overlying said track and connected to selected links, and a plurality of pans, one of said pans being hingedly connected to each of said plates.

5. A conveyor system comprising a track substantially U-shaped in section, a conveyor chain in said track, a plurality of cover plates overlying said track, said cover plates being connected to said conveyor chain, and a plurality of pans, one pan hingedly connected to each of said cover plates.

6. A conveyor system comprising a track substantially U-shaped in section, a conveyor chain in said track, a plurality of cover plates overlying said track, means connecting said cover plates to said conveyor chain, a marginal lip on each cover plate adapted to overlie an adjacent cover plate, and a plurality of pans, one pan hingedly connected to each of said cover plates.

7. A conveyor system comprising a track substantially U-shaped in section, a conveyor chain in said track, a plurality of cover plates overlying said track, means connecting said cover plates to said conveyor chain, a plurality of pans, one pan being hingedly connected to each of said cover plates, said hinged connection allowing said pans to be swung through an arc of at least 90 degrees.

EDWARD J. ALBRIGHT.

REFERENCES CITED

The following references are of record in the file of this patent:

UNITED STATES PATENTS

| Number | Name | Date |
| --- | --- | --- |
| 501,331 | Doolittle | July 11, 1893 |
| 703,903 | Dodge | July 1, 1902 |
| 1,422,673 | Collins | July 11, 1922 |
| 1,492,178 | Nicholas | Apr. 29, 1924 |
| 1,535,338 | Pade | Apr. 28, 1925 |
| 1,560,680 | Fernandes | Nov. 10, 1925 |
| 1,580,745 | McBride | Apr. 13, 1926 |
| 2,027,266 | Bogaty | Jan. 7, 1936 |
| 2,319,617 | Manierre | May 18, 1943 |
| 2,381,044 | Franz | Aug. 7, 1945 |